United States Patent [19]
Greenblatt et al.

[11] Patent Number: 6,063,857
[45] Date of Patent: May 16, 2000

[54] SOLUBILIZED HYDROPHOBICALLY-MODIFIED ALKALI-SOLUBLE EMULSION POLYMERS

[75] Inventors: Gary David Greenblatt, Rydal; Willie Lau, Ambler; Andrew Gordon Batzell, 3rd, Philadelphia, all of Pa.

[73] Assignee: Rohm and Haas Company, Philadelphia, Pa.

[21] Appl. No.: 09/119,500

[22] Filed: Jul. 20, 1998

Related U.S. Application Data

[60] Provisional application No. 60/053,832, Jul. 29, 1997.

[51] Int. Cl.$^7$ .............................. C08L 5/16; C08L 33/04; C08F 220/26
[52] U.S. Cl. ............................ 524/561; 524/48; 524/560; 526/318.42
[58] Field of Search ....................... 526/318.42; 524/560, 524/561, 48

[56] References Cited

U.S. PATENT DOCUMENTS

| | | | |
|---|---|---|---|
| 4,351,754 | 9/1982 | Dupre | 524/445 |
| 4,384,096 | 5/1983 | Sonnabend | 526/313 |
| 4,730,080 | 3/1988 | Shay et al. | 524/555 |
| 4,990,373 | 2/1991 | Kittle | 252/321 |
| 5,137,571 | 8/1992 | Eisenhart et al. | 524/48 |
| 5,376,709 | 12/1994 | Lau et al. | 524/48 |
| 5,476,900 | 12/1995 | Jenkins et al. | 524/823 |
| 5,521,266 | 5/1996 | Lau | 526/200 |
| 5,530,056 | 6/1996 | Farwaha et al. | 524/558 |
| 5,583,214 | 12/1996 | Partain, III | 536/84 |
| 5,639,841 | 6/1997 | Jenkins | 526/301 |
| 5,686,024 | 11/1997 | Dahanayake et al. | 252/356 |
| 5,712,342 | 1/1998 | Kim et al. | 524/591 |

FOREIGN PATENT DOCUMENTS

| | | |
|---|---|---|
| 0190 892 B1 | 1/1986 | European Pat. Off. . |
| 0 444 791 A1 | 2/1991 | European Pat. Off. . |

OTHER PUBLICATIONS

European Search Report dated Dec. 10, 1998.

*Primary Examiner*—Peter A. Szekely

[57] ABSTRACT

Aqueous solutions of hydrophobically-modified alkali-soluble emulsion polymers which exhibit relatively low solution viscosity are disclosed. Such solutions are particularly useful for controlling the viscosity of aqueous systems to which the solutions are added.

8 Claims, No Drawings

SOLUBILIZED HYDROPHOBICALLY-MODIFIED ALKALI-SOLUBLE EMULSION POLYMERS

This application claims the benefit of U.S. Provisional No. 60/053,832 filed Jul. 29, 1997.

The present invention relates to solubilized hydrophobically-modified alkali-soluble polymers. In particular the present invention relates to aqueous solutions of hydrophobically-modified alkali-soluble emulsion polymers. More particularly, the present invention relates to such aqueous solutions which exhibit relatively low solution viscosity. Such solutions are particularly useful for controlling the viscosity of aqueous systems to which the solutions are added.

Hydrophobically-modified alkali-soluble emulsion ("HASE") polymers are polymers which are typically utilized for increasing the viscosity of aqueous solutions. The polymer typically is a copolymer which contains an anionic group, a hydrophobic group, and a nonionic group. HASE polymers are typically provided as aqueous latex dispersions at low pH with low viscosities. Surfactants are typically included in the dispersion to stabilize the HASE polymer latex. End users neutralize the low pH HASE polymer with concentrated base such as sodium hydroxide or ammonium hydroxide. The handling of concentrated base may be inconvenient for the end user. A neutralized HASE polymer is desirable so that neutralization with concentrated base by the end user is eliminated.

Neutralized HASE polymers have very high viscosities. Due to the high viscosities, neutralized HASE polymers are difficult to pump. The viscosity of a neutralized HASE polymer may be reduced through diluting the polymer solution, however there is a practical limit on the solids level of a HASE polymer solution. HASE polymer solutions with solids levels below 5% by weight are not practical. There is a need for pumpable, neutralized, HASE polymers with solids levels of at least 5% by weight.

U.S. Pat. No. 5,476,900 discloses a method for preparing aqueous polymer emulsions useful as thickening agents. The patent discloses the addition of up to 1% surfactant to enhance thickening when the polymer, at a solids level up to 5% is neutralized.

Despite the disclosure of the prior art, there is a continuing need for pumpable, neutralized, HASE polymers with solids levels of at least 5% by weight.

We have surprisingly found that the compositions and the process of this invention provide neutralized HASE polymers which have low viscosities, are pumpable, and have solids levels of at least 5% by weight.

The present invention provides a composition comprising:
  water;
  at least 5% by weight neutralized HASE polymer; and
  less than 1 percent by weight, based on HASE polymer solids, of surfactant.

The present invention also provides a method for preparing a neutralized HASE polymer comprising:
  1) emulsion polymerizing a mixture of monomers comprising
    a) from 30 to 75 parts by weight of nonionic monomer;
    b) from 5 to 75 parts by weight of anionic monomer; and
    c) from 1 to 20 parts by weight of hydrophobic monomer
  in the presence of less than 1 percent by weight surfactant based on the weight of the monomers, to form a polymer emulsion of HASE polymer;

2) diluting the HASE polymer to provide a level of HASE polymer solids of from 5 to 70 percent by weight; and
  3) neutralizing the HASE polymer.

The HASE polymer compositions of this invention are neutralized emulsion polymers comprising from 30 to 75 parts by weight of nonionic monomer; from 5 to 75 parts by weight of anionic monomer; and from 1 to 20 parts by weight of hydrophobic monomer. The HASE polymer compositions of this invention may be prepared by conventional polymerization techniques. We have surprisingly found that reduction of surfactant decreases the viscosity of neutralized HASE polymers, and therefore the polymerization process is typically run in the presence of less than 1 percent by weight surfactant based on the weight of the monomers. The process of this invention requires emulsion polymerizing a mixture of monomers comprising from 30 to 75 parts of nonionic monomer; from 5 to 75 parts of anionic monomer; and from 1 to 20 parts of hydrophobic monomer in the presence of less than 1 percent by weight surfactant based on the weight of the monomers, to form a HASE polymer. The emulsion polymerization may be catalyzed by anionic, cationic, or free-radical producing initiators. Free-radical producing initiators are preferred. The free-radical producing initiators typically are peroxygen compounds including inorganic persulfate compounds such as ammonium persulfate, potassium persulfate, and sodium persulfate; peroxides such as hydrogen peroxide; organic hydroperoxides such as cumene hydroperoxide and t-butyl hydroperoxide; organic peroxides such as benzoyl peroxide, acetyl peroxide, lauroyl peroxide, peracetic acid, and perbenzoic acid (sometimes activated by a water-soluble reducing agent such as a ferrous compound or sodium bisulfite); as well as other free-radical producing materials such as 2,2'-azobisisobutyronitrile. Other methods of initiation such as the use of irradiation with Ultra Violet light, Ultrasonic, or mechanical means to induce free-radical generation are deemed to be within the scope of this invention.

A macromolecular organic compound having a hydrophobic cavity may be utilized in the process of making the HASE polymer Suitable macromolecular organic compounds include cyclodextrin, cyclodextrin derivatives, cycloinulohexose, cycloinuloheptose, cycloinuloctose, calyxarene and cavitand. Cyclodextrin includes α-cyclodextrin, β-cyclodextrin and γ-cyclodextrin. Cyclodextrin derivatives include the methyl, triacetyl, hydroxypropyl and hydroxyethyl derivatives of α-cyclodextrin, β-cyclodextrin and γ-cyclodextrin. Preferred are α-cyclodextrin, β-cyclodextrin and γ-cyclodextrin. More preferred are the methyl, triacetyl, hydroxypropyl and hydroxyethyl derivatives of α-cyclodextrin, β-cyclodextrin and γ-cyclodextrin. The amount of macromolecular organic compound having a hydrophobic cavity used is typically from 0 to 50 weight percent, preferably 0 to 30 weight percent, more preferably 0 to 10 weight percent based on the total composition to be reacted.

By nonionic monomer is meant a monomer that does not contain a positive or negative charge when in aqueous solution. The nonionic monomers of this invention have carbon chains that are less than 8 carbon units in length. The amount of nonionic monomer as polymerized units in the HASE polymer is typically 30 to 75 parts by weight, preferably 35 to 70 parts by weight, more preferably 40 to 65 parts by weight. Suitable nonionic monomers include $C_1$–$C_7$ alkyl and $C_2$–$C_7$ hydroxyalkyl esters of acrylic and methacrylic acid including ethyl (meth)acrylate, methyl (meth)acrylate, 2-ethylhexyl acrylate, butyl (meth)acrylate, 2-hydroxyethyl acrylate, 2-hydroxybutyl methacrylate, styrene, vinyltoluene, t-butyl styrene, isopropylstyrene, and p-chlorostyrene; vinyl acetate, vinyl butyrate, vinyl caprolate, acrylonitrile, methacrylonitrile, butadiene, isoprene, vinyl chloride, vinylidene chloride, and the like. Preferred are ethyl (meth)acrylate, methyl (meth)acrylate, 2-ethylhexyl acrylate, butyl (meth)acrylate, 2-hydroxyethyl acrylate, and 2-hydroxybutyl methacrylate. More preferred are ethyl acrylate, methyl acrylate, and butyl acrylate.

By anionic monomer is meant a monomer which contains a negative charge when in a basic aqueous solution. The amount of anionic monomer as polymerized units in the HASE polymer is typically 5 to 75 parts by weight, preferably 10 to 60 parts by weight, more preferably 20 to 50 parts by weight. Suitable anionic monomers include acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride. Acrylic acid, itaconic acid, 2-acrylamido-2-methyl-1-propanesulfonic acid, fumaric acid, and methacrylic acid are preferred. Methacrylic acid, 2-acrylamido-2-methyl-1-propanesulfonic acid, and acrylic acid are more preferred.

By hydrophobic monomer is meant surfactant esters such as $C_8$–$C_{30}$ alkylphenoxy (ethyleneoxy)$_{6-100}$ ethyl (meth) acrylates and $C_8$–$C_{30}$ alkoxy (ethyleneoxy)$_{6-50}$ ethyl (meth) acrylates; $C_8$–$C_{30}$ alkylphenoxy ethyl (meth)acrylates; and $C_8$–$C_{30}$ alkoxy ethyl (meth)acrylates. Other linkages such as, but not limited to ethers, amides and urethanes can be used. Hydrophobic monomers such as, but not limited to vinyl esters of $C_8$–$C_{30}$ carboxylic acid and $C_8$–$C_{30}$ alkyl ester of (methyl)acrylate can also be used. The amount of hydrophobic monomer as polymerized units in the HASE polymer is typically 1 to 20 parts by weight, preferably 1 to 15 parts by weight, more preferably 1 to 10 parts by weight. Suitable hydrophobic monomers include $C_{18}H_{37}(EO)_{20}$ (meth)acrylate and $C_{12}H_{25}(EO)_{23}$ (meth)acrylate. Preferred are $C_{18}H_{37}(EO)_{20}$ methacrylate and $C_{12}H_{25}(EO)_{23}$ methacrylate.

Chain transfer agents may be used to control the molecular weight of the HASE polymer. Suitable chain transfer agents are mercaptans, such as, for example, dodecylmercaptan, methyl mercaptopropionate, and mercaptopropionic acid. The chain transfer agent may be used at from 0.05% to 10% based on the total weight of the polymeric composition.

The HASE polymer may contain a polyethylenically unsaturated copolymerizable monomer effective for crosslinking, such as, for example, diallylphthalate, divinylbenzene, allyl methacrylate, trimethylol propane triacrylate, ethylene glycol diacrylate or dimethacrylate, 1,6-hexanediol diacrylate or dimethacrylate, diallyl benzene and the like. Typically, from 0.05 weight percent to 20 weight percent of the crosslinking agent is used, based on the total weight of the monomers.

By surfactant is meant a compound which reduces surface tension when dissolved in water or water solutions, or which reduces interfacial tension between two liquids, or between a liquid and a solid. Included in surfactants are detergents, wetting agents, lubricants, and emulsifiers. The total amount of surfactant in the HASE polymer dispersion is typically less than 1 percent by weight, preferably less than 0.5 percent by weight, more preferably less than 0.2 percent by weight based on the total weight of the dry polymer. The level of surfactant present may be controlled through the addition of less than than 1 percent by weight surfactant, based on the total weight of the dry polymer to the polymerization process. In the event that more than 1 percent by weight surfactant based on the total weight of the dry polymer is added to the polymerization process or thereafter, the level of surfactant may be reduced to less than 1 percent, based on the total weight of the dry polymer through the use of ultrafiltration or diafiltration.

The HASE polymer is neutralized. By neutralized is meant that greater than 60% of the acidic groups of the HASE polymer are neutralized. Neutralization is performed after the polymerization is complete. The sample may be held and cooled, and is combined with neutralizer solution comprising base and water to the desired solids level. A macromolecular organic compound having a hydrophobic cavity, may also be utilized in the neutralizer solution. Suitable macromolecular organic compounds include cyclodextrin, cyclodextrin derivatives, cycloinulohexose, cycloinuloheptose, cycloinuloctose, calyxarene and cavitand. Cyclodextrin includes α-cyclodextrin, β-cyclodextrin and γ-cyclodextrin. Cyclodextrin derivatives include the methyl, triacetyl, hydroxypropyl and hydroxyethyl derivatives of α-cyclodextrin, β-cyclodextrin and γ-cyclodextrin. Preferred are α-cyclodextrin, β-cyclodextrin and γ-cyclodextrin. More preferred are the methyl, triacetyl, hydroxypropyl and hydroxyethyl derivatives of α-cyclodextrin, β-cyclodextrin and γ-cyclodextrin. Suitable base includes sodium hydroxide and ammonium hydroxide.

The HASE polymer may be diluted to provide a level of HASE polymer solids of typically from 5 to 50 percent by weight, preferably 5 to 30 percent by weight, more preferably 10 to 25 percent by weight.

The viscosity of the neutralized HASE polymer aqueous solutions may be measured by conventional techniques, such as the use of a Brookfield® viscometer. When measured by a Brookfield viscometer, neutralized HASE polymers typically have viscosities below 15,000 milli pascal seconds. Preferred are neutralized HASE polymers with viscosities below 10,000 milli pascal seconds. More preferred are neutralized HASE polymers with viscosities below 5,000 milli pascal seconds.

We have surprisingly found that reduction of surfactant decreases the viscosity of neutralized HASE polymers. The HASE polymers within the scope of this invention typically have a viscosity of at least 300 milli pascal seconds when measured as a 5 percent by weight aqueous solution of the neutralized HASE polymer in the presence of an added 2 percent by weight based on the weight of the neutralized HASE polymer of sodium lauryl sulfate.

The HASE polymer compositions of this invention are useful in any application where thickeners are typically used. Such applications include architectural and industrial coatings including paints, wood coatings, inks; paper coatings; adhesives; mastics; plastics; plastic additives; petroleum additives; nonwovens; textiles; drilling muds; cosmetics and the like.

The following abbreviations are used throughout this patent application: LEOMA=$C_{12}H_{25}(EO)_{23}$ methacrylate SEOMA=$C_{18}H_{37}(EO)_{20}$ methacrylate BA=butyl acrylate MAA=methacrylic acid SLS=sodium lauryl sulfate CD=methyl-β-cyclodextrin MPA=mercaptopropionic acid nDDM=n-dodecyl mercaptan Id.=sample identification number °C=degrees centigrade MMP=methyl mercaptopropionate HEM=hydroxyethyl mercaptan (meth)acrylate=methacrylate and acrylate pph=parts per hundred BMP=butyl mercaptopropionate g=grams AMPS=2-acrylamido-2-methyl-1-propanesulfonic acid The following Table lists some of the materials used in this patent application and their sources:

| Material | Function | Source |
|---|---|---|
| Acumer ® 9300 | Dispersant | Rohm and Haas Company |
| Hydrafine ® | Clay | J. M. Huber Corporation |
| Hydraprint ® | Delaminated Clay | J. M. Huber Corporation |
| Res ® 4126 | Binder | Ameripol Synpol |

EXAMPLE 1

Polymerizations were carried out in a 3 liter round bottom flask equipped with a mechanical stirrer, temperature control device, condenser, nitrogen inlet, and monomer and initiator feed lines. To the flask was added 1,000 g deionized water at room temperature and methyl-β-cyclodextrin ("CD") as indicated in Table 1 (all weights are in grams). The contents of the flask were heated to 85° C. while stirring under a nitrogen blanket. A monomer mixture was prepared to form the reaction mixture in accordance with Table 1. An initial initiator consisting of 1 g sodium persulfate dissolved in 10 g deionized water was prepared. A cofeed initiator solution of 2.4 g sodium persulfate dissolved in 100 g deionized water was prepared. The initial initiator solution was added to the flask. The reaction mixture and the cofeed initiator solution were fed seperately but simultaneously into the reaction flask over a 100 minute period. The sample was held for 10 minutes, cooled to 70° C., and combined with neutralizer solution comprising 0 to 97.5 grams CD, 200 grams base, and water to the desired solids levels.

EXAMPLE 2

Some of the samples from Table 1 were tested for viscosity on a Brookfield RV viscometer. Samples were tested at 20° C. with the instrument set at 100 rotations per minute. The results are in Tables 2, 3, and 4.

TABLE 2

| Sample | 15% With 5% CD |
|---|---|
| 1 | 668 |
| 2 | 12,720 |
| 3 | 1,808 |
| 4 | 6,930 |
| 5 | 4,520 |
| 6 | 1,178 |
| 7 | 2,580 |
| 8 | 1,104 |
| 9 | 4,390 |
| 10 | 1,250 |
| 11 | 1,100 |
| *17 | >100,000 |

* = Comparative Sample

TABLE 3

| Sample | 5% |
|---|---|
| 1 | 730 |
| 2 | 757 |
| 6 | 464 |
| 10 | 194 |
| 11 | 174 |
| 12 | 750 |
| 13 | 118 |
| 14 | 368 |
| 15 | 96 |
| 16 | 330 |
| *17 | >100,000 |
| 18 | 113 |

* = Comparative Sample

TABLE 1

| Id. | CD | EA | MAA | AA | nDDM | SEOMA | LEOMA | AMPS |
|---|---|---|---|---|---|---|---|---|
| 1 | 0 | 275 | 185 | 25 | 0.9 | 15 | 0 | 0 |
| 2 | 2.5 | 275 | 190 | 25 | 0.9 | 10 | 0 | 0 |
| 3 | 2.5 | 225 | 225 | 25 | 0.9 | 18.75 | 6.25 | 0 |
| 4 | 2.5 | 300 | 155 | 25 | 1.2 | 15 | 5 | 0 |
| 5 | 2.5 | 250 | 125 | 100 | 0.9 | 18.75 | 6.25 | 0 |
| 6 | 2.5 | 250 | 225 | 0 | 0.9 | 18.75 | 6.25 | 0 |
| 7 | 2.5 | 250 | 195 | 25 | 1.2 | 22.5 | 7.5 | 0 |
| 8 | 5 | 275 | 190 | 25 | 0.9 | 10 | 0 | 0 |
| 9[1] | 10 | 275 | 185 | 25 | 0.9 | 15 | 0 | 0 |
| 10 | 0 | 260 | 210 | 0 | 0 | 0 | 0 | 30 |
| 11 | 0 | 270 | 230 | 0 | 0 | 0 | 0 | 0 |
| 12 | 2.5 | 247 | 199.5 | 0 | 0.6[2] | 0 | 25 | 28.5 |
| 13 | 2.5 | 247 | 199.5 | 0 | 0.6[3] | 0 | 25 | 28.5 |
| 14 | 2.5 | 247 | 199.5 | 0 | 0.6[4] | 0 | 25 | 28.5 |
| 15 | 2.5 | 247 | 199.5 | 0 | 0.6 | 0 | 25 | 28.5 |
| 16 | 2.5 | 247 | 199.5 | 0 | 0.6[5] | 0 | 25 | 28.5 |
| *17[6] | 10 | 275 | 175 | 25 | 0.9 | 0 | 25 | 0 |
| *18 | 2.5 | 291 | 199 | 0 | 1.2 | 0 | 10 | 0 |

[1] 0.2% sodium lauryl sulfate added to kettle.
[2] 3-MPA substituted for nDDM (equivalent to 0.9 g nDDM).
[3] BMP substituted for nDDM (equivalent to 0.9 g nDDM).
[4] 2-HEM substituted for nDDM (equivalent to 0.9 g nDDM).
[5] MMP substituted for nDDM (equivalent to 0.9 g nDDM).
[6] 1.6% sodium lauryl sulfate added to kettle.
* = Comparative Sample

TABLE 4

| Sample | 5% With 2% SLS |
| --- | --- |
| 6 | 12,640 |
| *18 | 260 |

* = Comparative Sample

EXAMPLE 3

Some of the compositions of this invention were tested for thickening properties in a typical pigmented paper coating. A pigmented paper coating was prepared by combining 80 pph Hydraprint® delaminated clay, 20 pph Hydrafine®@1 clay, 7 pph Res®4126, and 0.15 pph Acumer® 9300 dispersant. The pH was adjusted to 8.5–9 with ammonia. The compositions of this invention were add at the levels indicated in Table 3, and the viscosity of the sample was measured using the Brookfield viscometer at 100 rotations per minute. The results are shown in Table 5.

TABLE 5

| Sample | Level (pph) | Viscosity |
| --- | --- | --- |
| 5 | 0.35 | 962 |
| 6 | 0.35 | 998 |
| 7 | 0.5 | 1,000 |

The data above demonstrate the compositions of this invention are effective thickeners in pigmented paper coatings.

What is claimed:

1. A composition comprising:
   water;
   at least 5% by weight neutralized hydrophobically-modified alkali-soluble emulsion polymer; and
   less than 0.5 percent by weight, based on hydrophobically-modified alkali-soluble emulsion polymer solids, of surfactant; wherein the viscosity of the composition is below 15,000 milli pascal seconds.

2. The composition of claim 1 wherein the hydrophobically-modified alkali soluble emulsion polymer is selected from the group consisting of hydrophobically-modified alkali-soluble emulsion polymers which have a viscosity of at least 300 milli pascal seconds when measured as a 5 percent by weight aqueous solution of the neutralized hydrophobically-modified alkali-soluble emulsion in the presence of an added 2 percent by weight based on the weight of the neutralized hydrophobically-modified alkali-soluble emulsion polymer of sodium lauryl sulfate.

3. The composition of claim 1, further comprising a macromolecular organic compound having a hydrophobic cavity.

4. The composition of claim 3 wherein the macromolecular organic compound is selected from the group consisting of cyclodextrin, modified cyclodextrin, cycloinulohexose, cycloinuloheptose, cycloinuloctose, calyxarene and cavitand.

5. The composition of claim 4 wherein the macromolecular organic compound is a cyclodextrin selected from the group consisting of α-cyclodextrin, β-cyclodextrin and γ-cyclodextrin.

6. The composition of claim 5 wherein said macromolecular organic compound is a modified cyclodextrin selected from the group consisting of the methyl, triacetyl, hydroxypropyl and hydroxyethyl derivatives of α-cyclodextrin, β-cyclodextrin and γ-cyclodextrin.

7. A method for preparing a neutralized hydrophobically-modified alkali-soluble emulsion polymer comprising:
   1) emulsion polymerizing a mixture of monomers comprising
      a) from 30 to 75 parts by weight of nonionic monomer;
      b) from 5 to 75 parts by weight of anionic monomer; and
      c) from 1 to 20 parts by weight of hydrophobic monomer; in the presence of less than 0.5 percent by weight surfactant based on the weight of the monomers, to form a polymer emulsion of hydrophobically-modified alkali-soluble emulsion polymer;
   2) diluting the hydrophobically-modified alkali-soluble emulsion polymer to provide a level of hydrophobically-modified alkali-soluble emulsion polymer solids of from 5 to 70 percent by weight; and
   3) neutralizing the hydrophobically-modified alkali-soluble emulsion polymer.

8. The composition of claim 1 wherein the surfactant is present at a level of less than 0.2 percent by weight based on the weight of the monomers.

\* \* \* \* \*